Oct. 31, 1961 J. M. BLACKHALL 3,007,007

TOLL TICKETING TELEPHONE SYSTEM

Filed March 27, 1958 11 Sheets-Sheet 1

INVENTOR.
JAMES M. BLACKHALL

BY C. A. Gulbrandsen

ATTY.

Oct. 31, 1961 J. M. BLACKHALL 3,007,007

TOLL TICKETING TELEPHONE SYSTEM

Filed March 27, 1958 11 Sheets-Sheet 2

INVENTOR.
JAMES M. BLACKHALL

BY C. A. Gulbrandsen

ATTY.

INVENTOR.
JAMES M. BLACKHALL
BY C. A. Dullbrandsen
ATTY.

TOLL TICKETING TELEPHONE SYSTEM

Filed March 27, 1958 11 Sheets-Sheet 4

INVENTOR.
JAMES M. BLACKHALL

BY
C. A. Gulbrandsen
ATTY

Oct. 31, 1961 J. M. BLACKHALL 3,007,007

TOLL TICKETING TELEPHONE SYSTEM

Filed March 27, 1958 11 Sheets-Sheet 5

INVENTOR.
JAMES M. BLACKHALL

BY C. A. Gulbrandsen

ATTY.

Oct. 31, 1961 J. M. BLACKHALL 3,007,007

TOLL TICKETING TELEPHONE SYSTEM

Filed March 27, 1958 11 Sheets-Sheet 6

INVENTOR.
JAMES M. BLACKHALL

BY
C. A. Gulbrandsen
ATTY.

Oct. 31, 1961 J. M. BLACKHALL 3,007,007

TOLL TICKETING TELEPHONE SYSTEM

Filed March 27, 1958 11 Sheets-Sheet 7

INVENTOR.
JAMES M. BLACKHALL

BY C. A. Gulbrandsen

ATTY.

INVENTOR.
JAMES M. BLACKHALL

BY C. A. Gulbrandsen

ATTY.

Oct. 31, 1961 J. M. BLACKHALL 3,007,007

TOLL TICKETING TELEPHONE SYSTEM

Filed March 27, 1958 11 Sheets-Sheet 9

INVENTOR.
JAMES M. BLACKHALL

BY C. A. Gulbrandsen

ATTY.

Oct. 31, 1961 J. M. BLACKHALL 3,007,007

TOLL TICKETING TELEPHONE SYSTEM

Filed March 27, 1958 11 Sheets-Sheet 10

INVENTOR.
JAMES M. BLACKHALL

BY C. A. Gilbrandsen

ATTY.

INVENTOR.
JAMES M. BLACKHALL

BY

C. A. Gulbrandsen

ATTY.

3,007,007
TOLL TICKETING TELEPHONE SYSTEM

James M. Blackhall, La Grange, Ill., assignor to Automatic Electric Laboratories, Inc., a corporation of Delaware Filed Mar. 27, 1958, Ser. No. 724,355
11 Claims. (Cl. 179—18)

The present invention relates to automatic telephone systems in general, and in particular to improvements in automatic toll ticketing telephone systems of the type in which equipment is provided for the making of so-called type C or two-number toll calls.

In this type of system provisions are generally provided whereby the calling subscriber is compelled to register his own number at the central exchange in order to be able to complete a toll connection. This arrangement is particularly satisfactory in automatic systems of very sparsely settled communities which are remotely located from each other and where it is not convenient to install equipment of the type wherein an operator is called to ascertain the calling subscriber's directory number or to provide the relatively more complex equipment required to automatically determine the calling station directory number. In such sparsely settled communities it is also often desirous to limit the destinations to which the subscribers may dial toll calls automatically because of the possibility of making calls to destinations, the charges for which exceed the ability of the equipment to bill.

Accordingly, it is a broad general object of this invention to make provisions for effectively permitting the subscribers in such a network to complete all toll calls automatically with automatic station verification and at the same time to prevent said subscribers from dialing more remote locations which latter may only be reached with the aid of an operator.

It is still another object of the invention to provide circuits and apparatus for an automatic toll ticketing system which do not require the use of register sender or translator equipment to control the setting up of toll ticketing connections.

Another object of this invention is to provide equipment capable of cancelling the call while it is in the process of being set up, should the call be to a destination to which the subscriber is not entitled to dial himself.

It is another object of this invention to provide a unique means for verifying the calling subscriber's directory number simultaneously with this number being registered for billing purposes wherein said verification equipment is available to said ticketing register only during the period required to perform its function.

It is another feature of the invention that the equipment for determining whether the destination to which the toll call is being directed by the calling subscriber is one to which he is entitled to make and is also only utilized during the period required.

Further objects and features of the invention broadly stated are to improve systems of the above general character by the provision of new and improved circuits and apparatus for performing the necessary operations conveniently and economically.

Figure 1:
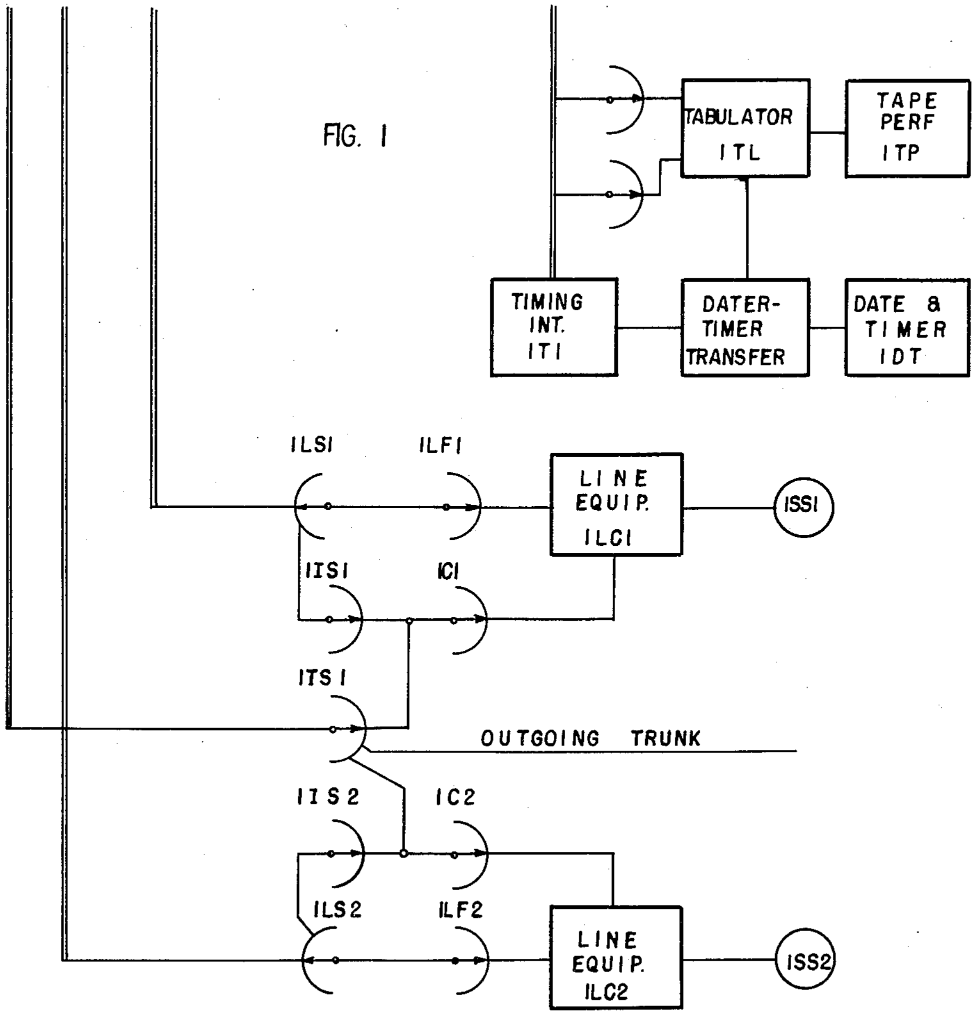
Figure 12:
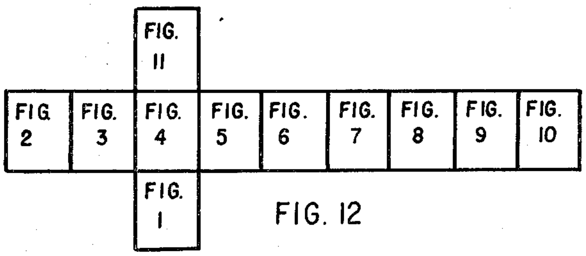
Figure 2:
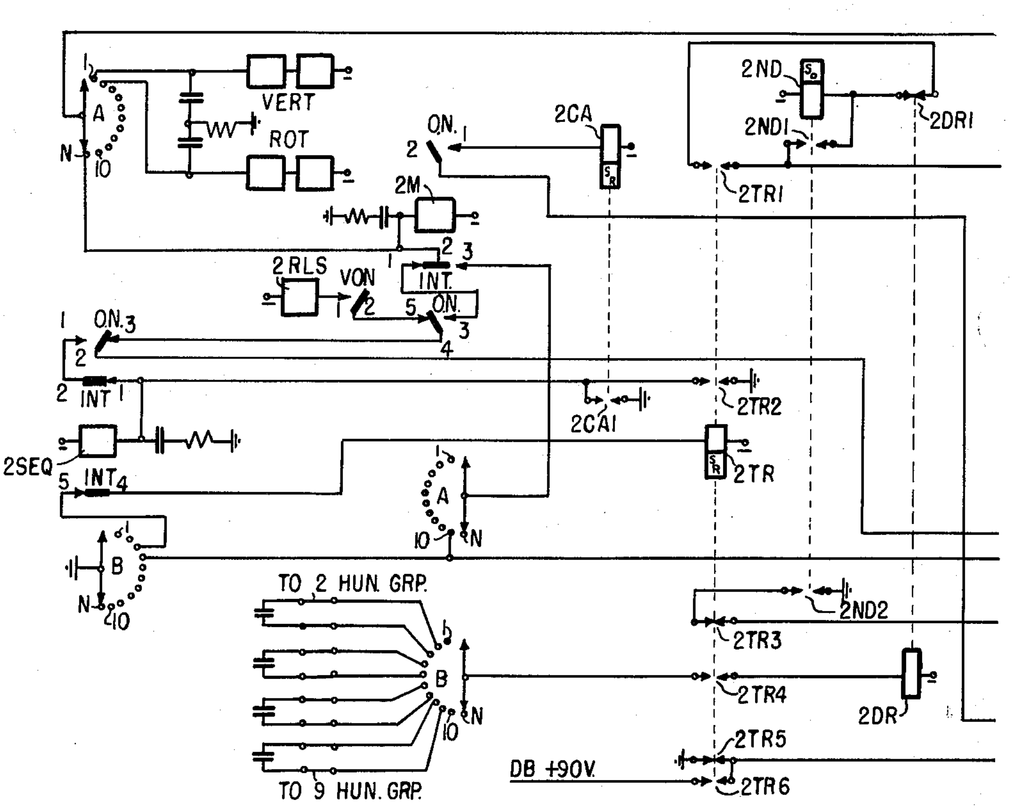
Figure 3:
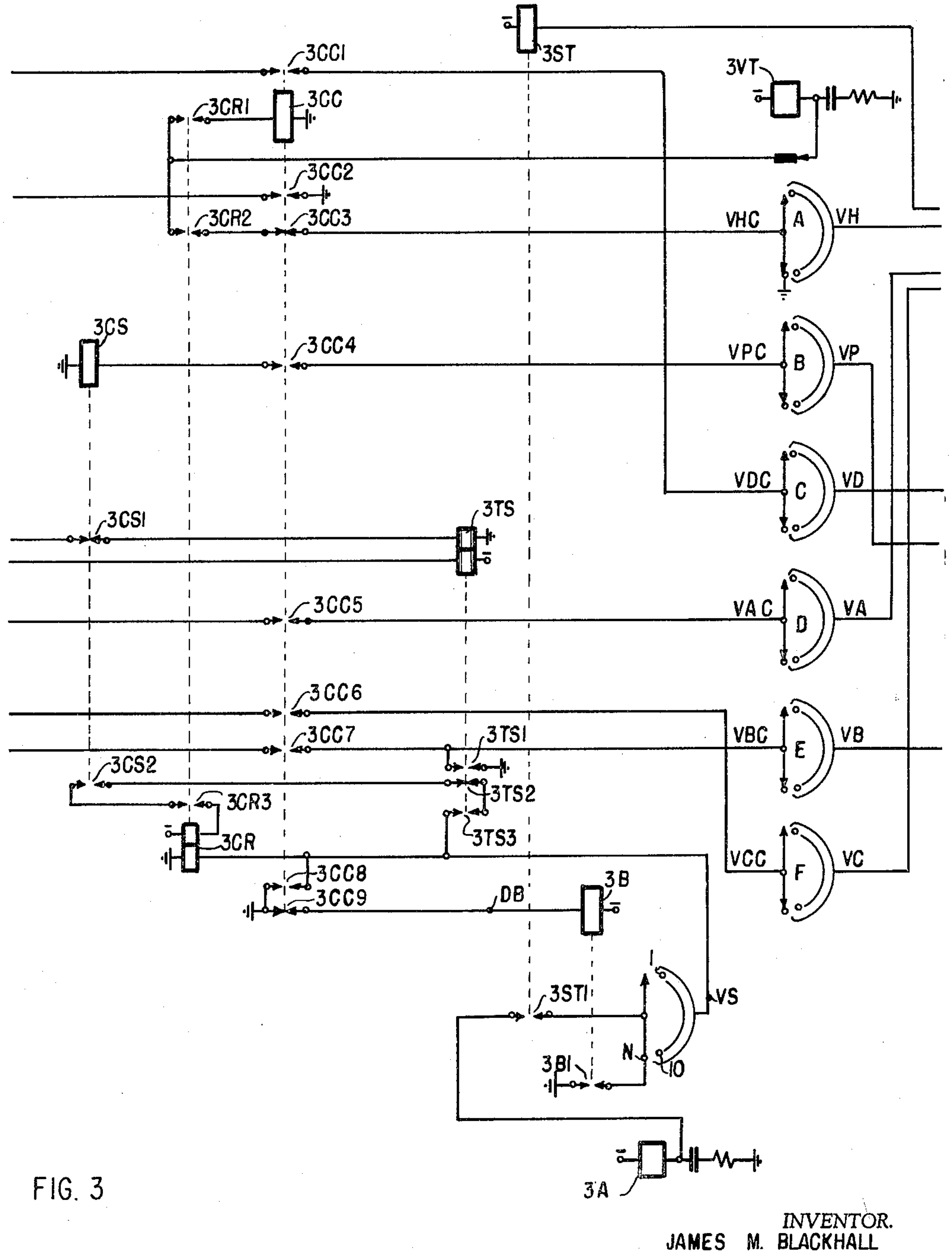
Figure 4:
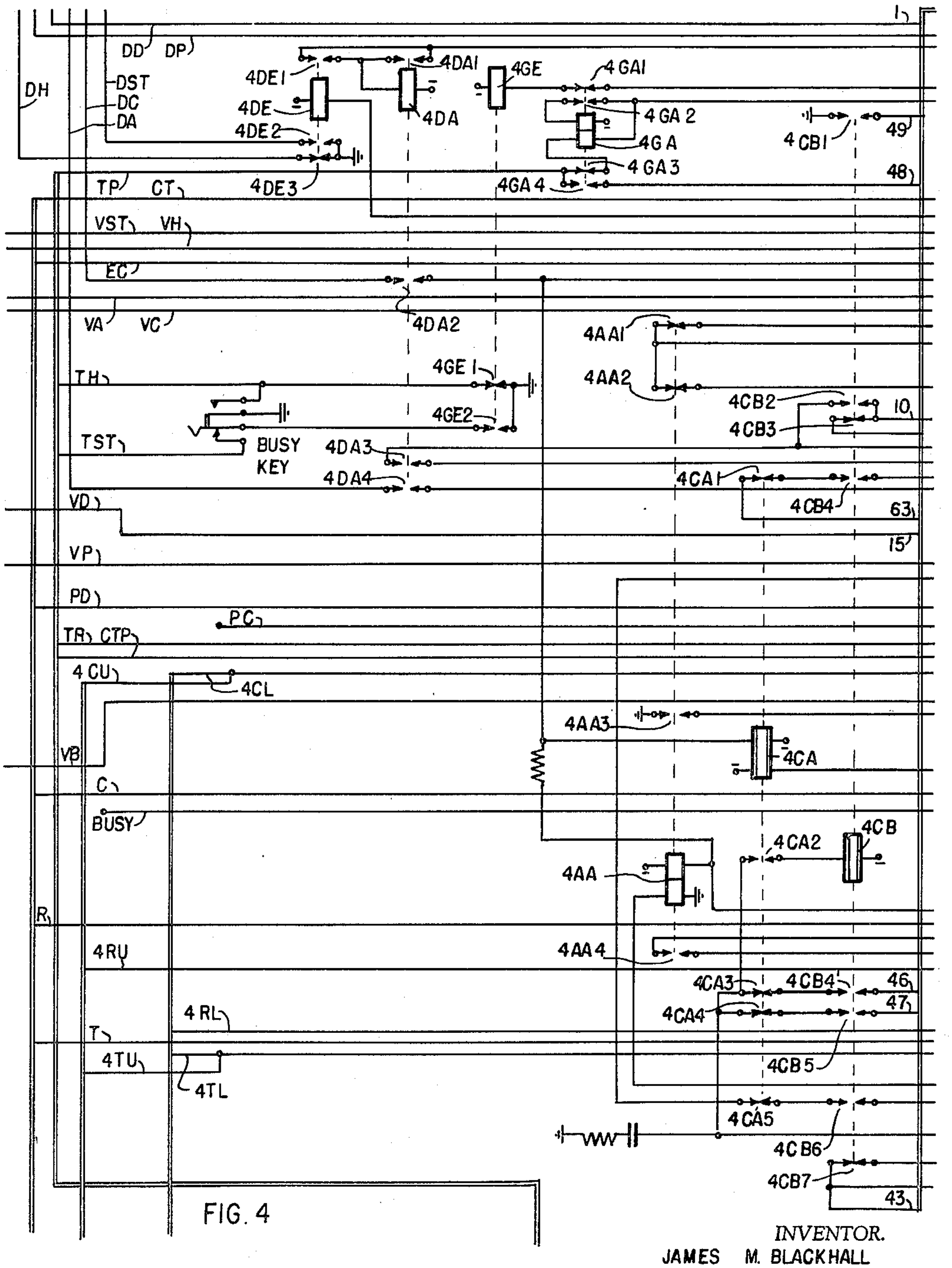
Figure 5:
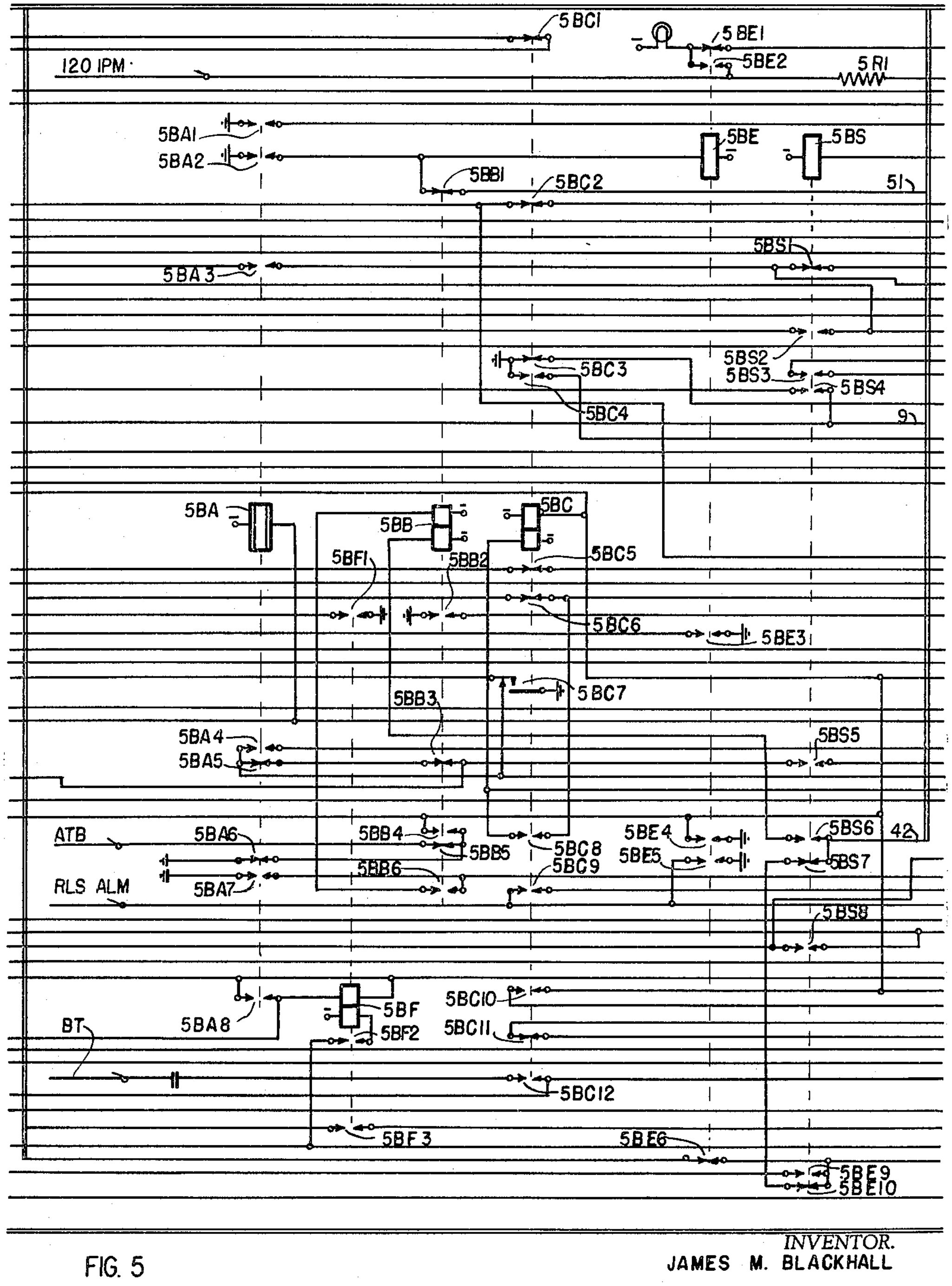
Figure 6:
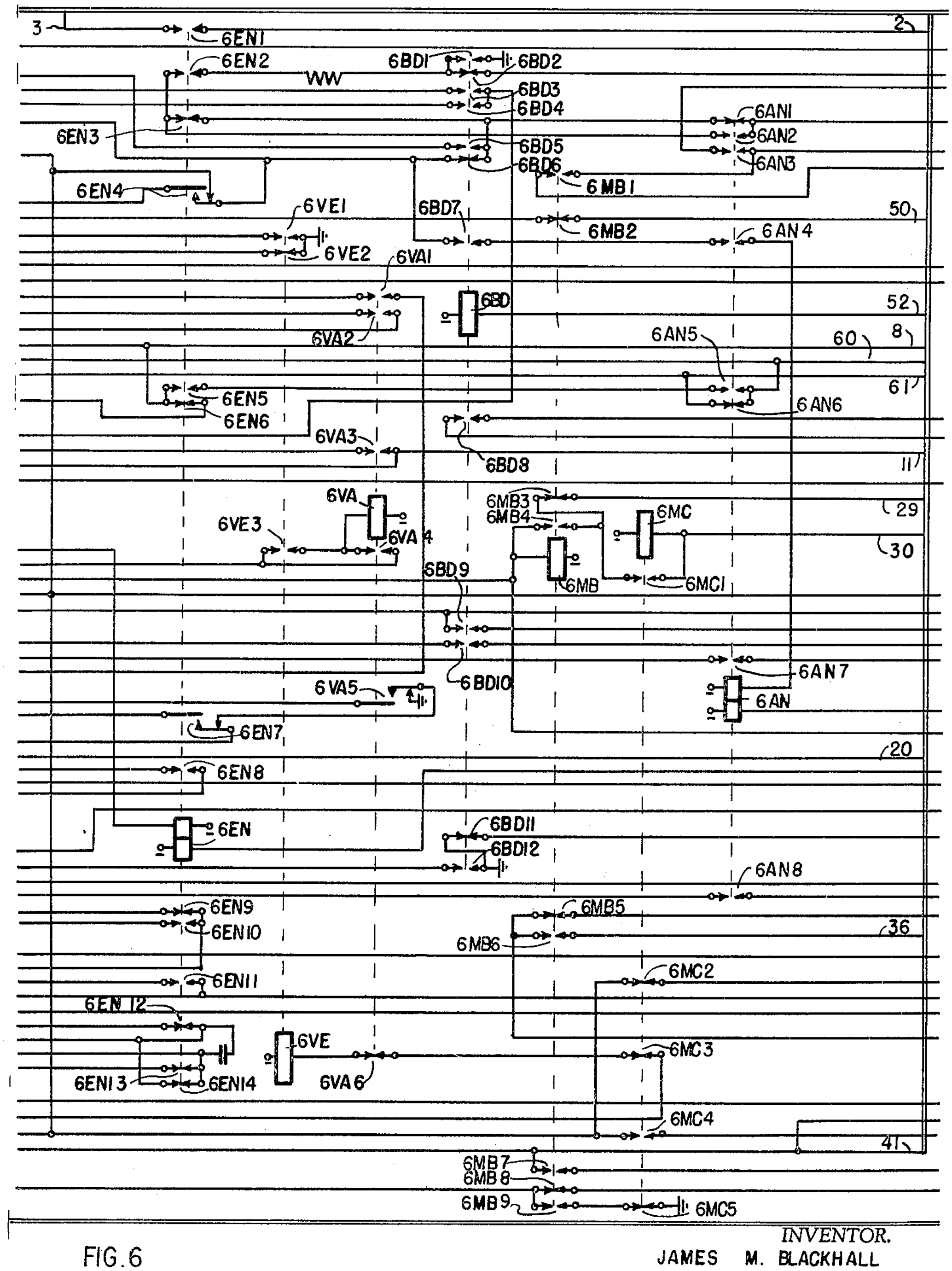
Figure 7:
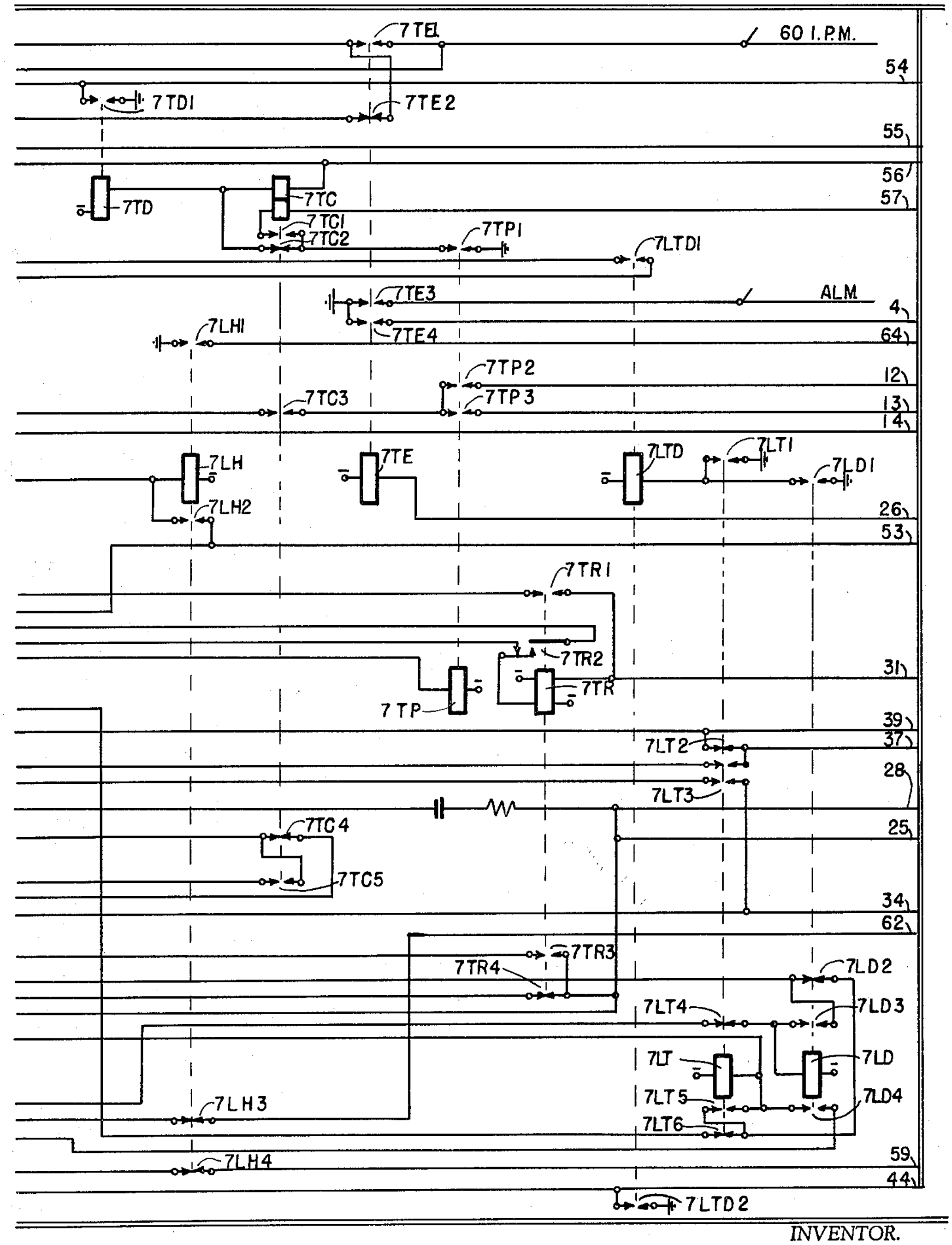
Figure 8:
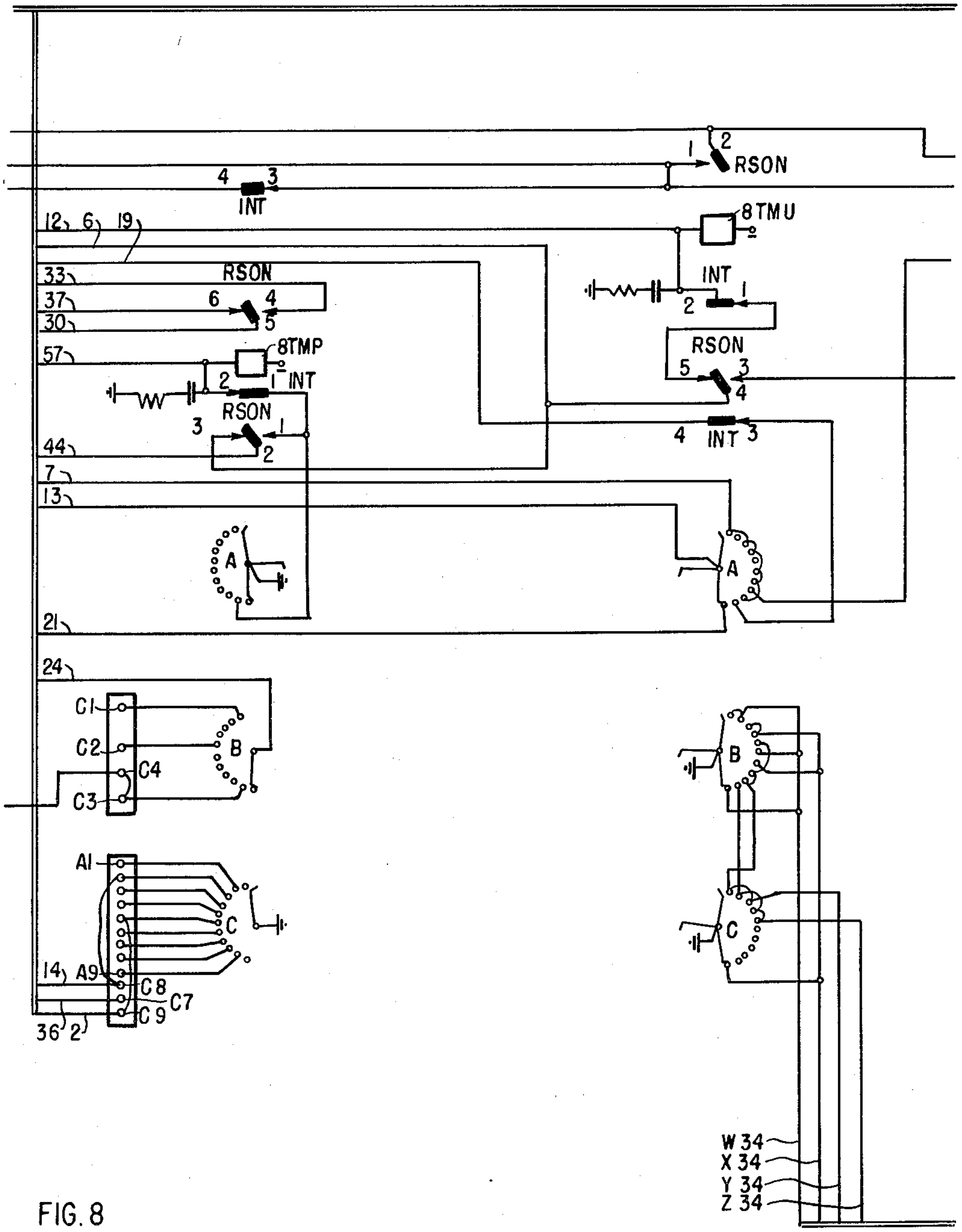
Figure 9:
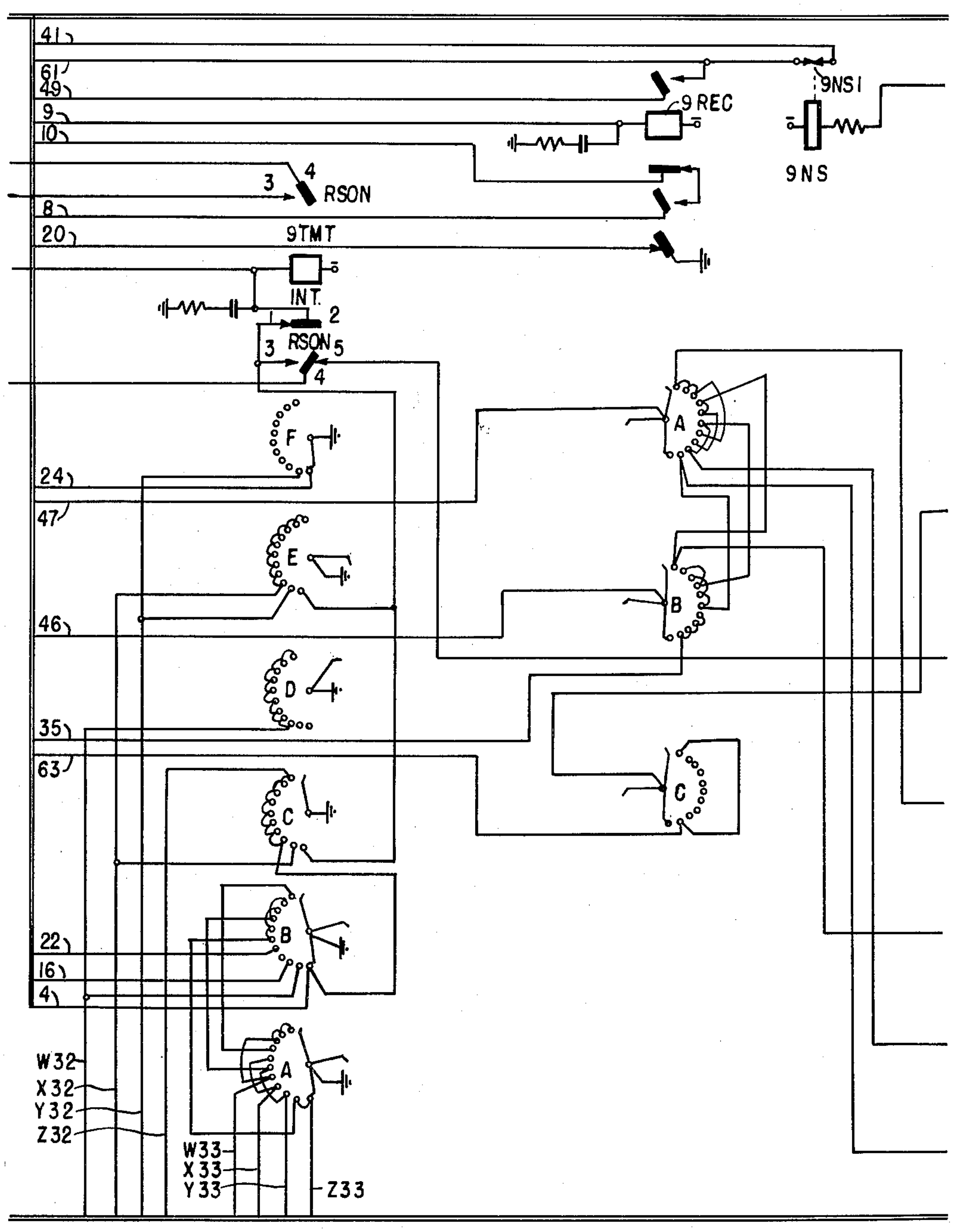
Figure 10:
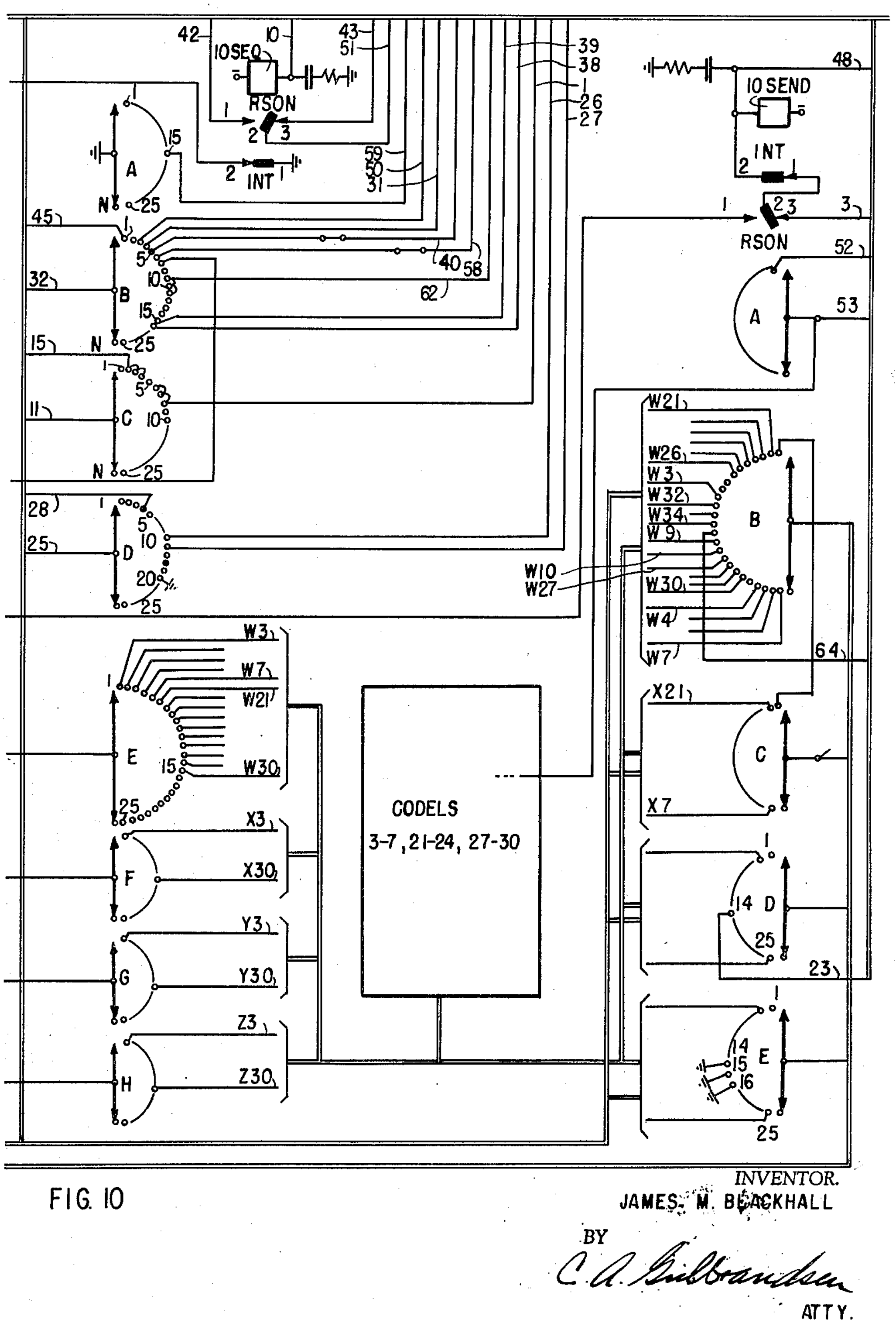
Figure 11:
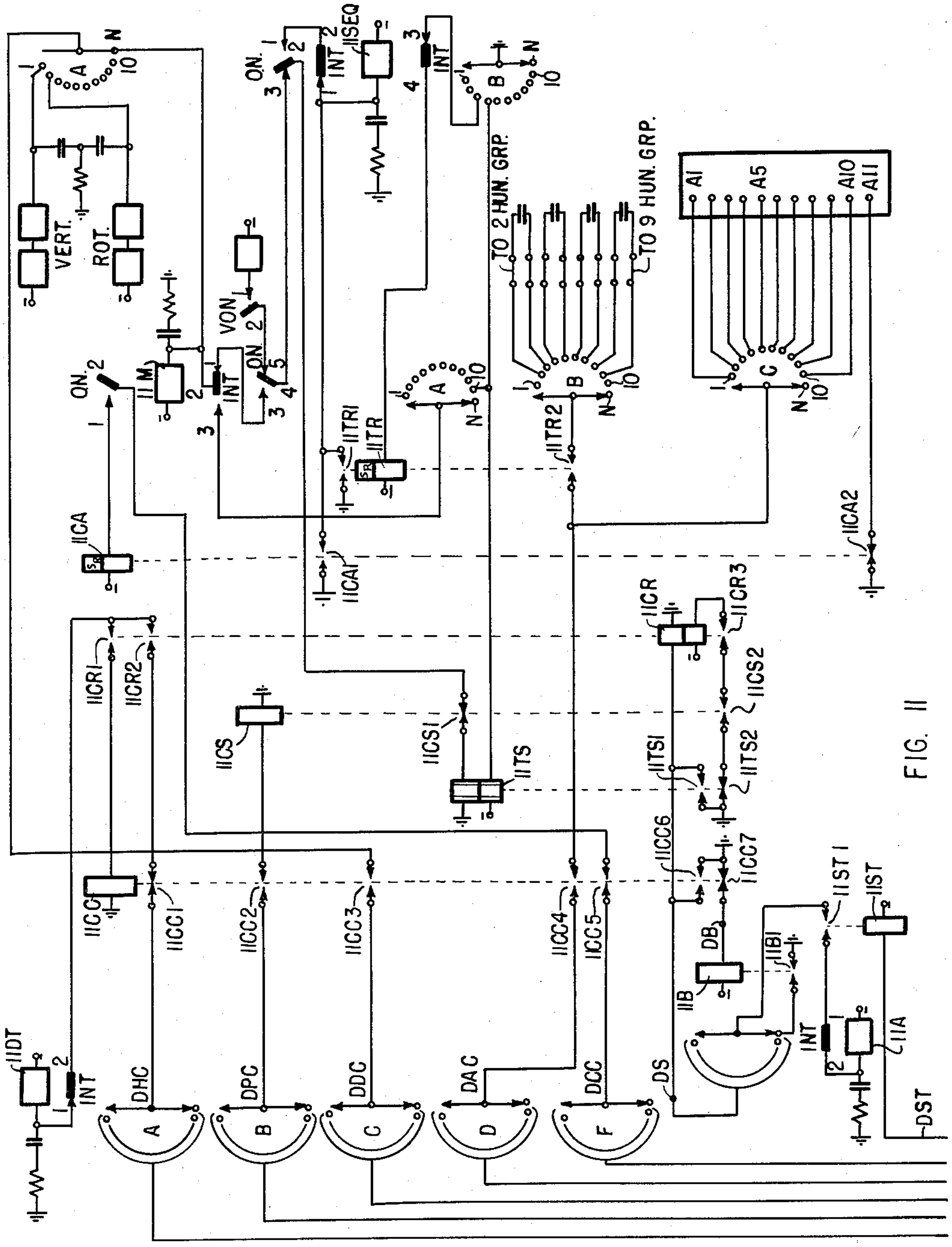

The invention, both as to its arrangement and its operation together with the advantages thereof, will best be understood by reference to the following specification taken in connection with the accompanying drawings in which FIG. 12 illustrates the manner of combining FIGS. 1 to 11 inclusive of the drawings to form a unified system. Also illustrated on FIG. 1 in schematic block diagram form is the switching equipment, the auxiliary toll ticketing equipment, a calling subscriber station and a branch exchange including switching equipment and another subscriber station. FIGS. 2 and 3 illustrate in schematic form the details of the verifier circuit located in the ticketing office. FIGS. 4 to 10 inclusive, illustrate in schematic form the details of the ticketer circuit. FIG. 11 illustrates the details of the discriminator circuit.

The general functions of the circuits involved in the processing of a call in the system of the present disclosure follows.

The ticketer circuit is seized from a local selector on locally originated calls, and from an incoming selector on calls originating in a branch exchange.

In this type of system, it is necessary to dial an access code to seize this circuit. Assuming that the calling subscriber has a five digit directory number he will then dial this number into the ticketer. The first digit dialed will be registered and the verifier circuit will be called for. As the subscriber dials the second, third and fourth digits of his number the verifier will simultaneously receive these digits with their being registered in the ticketer. The fifth digit dialed will be stored without being forwarded. If the subscriber has properly dialed his own number, he may continue to dial the called number. However if he has made an error in dialing his number the verifier so informs the ticketer and the remaining digits dialed by the subscriber are blocked.

If the call is to continue a discriminator is next called for. The first three digits of the called number as received by the ticketer are simultaneously stored and repeated to the discriminator. If the called number is of such a type that may be dialed directly by the calling subscriber, the verifier takes no action, but if the subscriber is not permitted to complete calls to the number he dialed, the ticketer is informed. The ticketer then blocks the dial pulses from the ticketer selector. When the subscriber finishes dialing he is given a busy tone to inform him that the call was not completed. Had the call been completed, the ticketer would time the length of conversation, from the time the called party answers until the calling party disconnects.

The ticketer is arranged to store the following ticketing information during conversation: the calling number; the called number, a change in toll rates indication, if it occurs during the call; and the conversation time.

After the calling party disconnects, the ticketing information is transferred to a tabulator. The ticketer restores after the transfer of information is completed. The ticketer is arranged for stop-dial and flashing signal supervision if these conditions should be encountered during the setting up of the call.

The verifier circuit registers the calling line number as dialed and checks the number against the number of the line actually being used by the calling subscriber. It is arranged to register three digit line numbers and can accommodate a total of 800 lines. Detector battery of about 90 volts applied to the "C" lead of the calling line is used for the verification check.

The discriminator circuit registers the office code of any called 2–5 number as dialed by the calling subscriber and on a basis of strapping of its banks it will either accept or reject with busy tone calls to any such office. This circuit can discriminate between 640 ABC office codes, and is arranged to reject any or all single digit codes.

The tabulator equipments function is to forward toll call ticketing data to tape perforators. The tabulator is described in detail in the Ostline application Serial No. 625,773 filed December 3, 1956.

Before proceeding with the description of the circuit, it should be noted that the apparatus illustrated in the figures is provided with numerical and letter designations. In order to facilitate cross referencing of the respective components on the various figures and the specification, the one or two digit number preceding the letter or letters of each designation corresponds with the figure on which it is located. These numbers are followed by a letter or letters, usually suggestive of the functional designation of the component. The contacts of the relays are shown as two opposing arrowheads separated slightly for make combinations and touching each other for break combinations. These contacts bear the designation assigned to the relay followed by a number indicating their relative position from the top of the figure. The rotary switches here used are of the well known type of rotary switch which advances its wipers in response to the deenergization of its stepping magnet. The switches with the larger bank capacities are of the type disclosed in Graybill and Sengebusch Patent No. 2,710,896, issued June 14, 1956. The switches shown with only an eleven point bank are of a similar construction. All of the rotary switches are designated in the same manner as are the relays. Where reference is required to some specific component, it is named in the specification followed by the reference characters of the rotary switch. The bank levels are designated by letters. The rotary switch off-normal and interrupter contacts are shown as conventional arrow heads for the make and break contacts. The armature contacts are illustrated as a heavy block canted slightly from the vertical for the off-normal combinations and in a horizontal position for the interrupter combinations. These contacts are designated by a number only, with the abbreviation INT or RSON to further indicate whether they are interrupter or off-normal combinations.

DETAILED OPERATION

*Seizure from local selector*

When the calling subscriber at station 1SS1 removes his receiver, the usual loop circuit, including the line conductors is completed. In response to the completion of the above mentioned loop circuit, the line circuit 1LC1 initiates operation of the distributor and marks the terminals of the calling subscriber line in the bank contacts of a group of line finders, including the line finder 1LF1, having access to the calling subscriber line. For the purpose of this description it will be assumed that the distributor selects the line finder 1LF1 and that it operates its wiper in a vertical and then in a rotary direction in the well known manner to select the terminals in the associated bank terminating the calling line. When the calling line is found by the line finder 1LF1, it extends the calling line to the individually associated first selector 1LS1 and the latter selector transmits the usual dial tone signal to the calling subscriber to indicate that the dialing may be started. The above noted switching apparatus, including the line circuit, the distributor, the line finder and the first selector may be of conventional construction and arrangement and may be, for example, of the type illustrated in the Bakker Patent No. 2,289,896, granted July 14, 1942, and in the Saunders Patent No. 1,849,694, granted March 15, 1932.

To extend the connection to the ticketer circuit of FIGS. 4 to 10, it is now necessary for the subscriber to dial the digit "9." Consequently, when the calling subscriber received the dialing tone signal the dial is to be actuated in accordance with the digit 9 to transmit nine loop impulses to the first selector 1LS1. This selector then raises its wipers in a vertical direction to the ninth level and then rotates its wipers over the selected level to search for an idle ticketer circuit, such as the ticketer circuit of FIGS. 4 to 10. It will be assumed for the purpose of this description that the first selector now extends the connection from the calling subscriber line to the ticketer circuit. The conductors include the "—" conductor 4TL, the "+" conductor 4RL and the control conductor 4CL. If the ticketer circuit is busy, the control conductor will be grounded in order to indicate the busy condition to the first selector. Thus, as the selector rotates its wipers over the ninth level it will pass over contacts terminating ticketer circuits having grounded control conductors corresponding to the 4CL conductor.

*Ticketer seizure*

Resistance battery through the number 2 winding of relay 4CA on lead 4CL marks this circuit idle to the preceding circuits. When seized, ground is forwarded over lead 4CL to the number 2 winding of relay 4CA and the loop is closed through to this circuit. When the loop is switched through, the "tip side" lead 4TL is closed to the number 2 winding of relay 4AA to ground, and the "ring" side is closed through the number 1 winding of relay 4AA to battery for lead 4RU for the incoming selector circuit, and through the number 1 winding of relay 5BF in series with the number 1 winding of relay 4AA to battery for lead 4RL for the local selector access. Relay 4CA operates and prepares a path to relay 4CB. Relay 4AA operates and closes a circuit to relay 5BA. Relay 5BA operates, closes ground to lead 4CU to hold the preceding equipment, shorts the number 1 winding of relay 5BF, removes ground from lead 5ATB at contacts 5BA6, closes ground to relay 5BS at contacts 5BA1, to the number 1 winding of relay 6AN and to relay 4CB, and this direct ground is also extended to light the ticketer monitor lamp, through contacts 5BE1, and opens the circuit to the number 2 winding of relay 4CA at contacts 5BA5. Since this circuit was seized over the local selector access, relay 5BF operates in series with relay 4AA, locks through the number 2 winding of relay 5BF when relay 5BA operates, and closes ground over lead 4PD to the ticketer selector circuit. The ticketer monitor lamp remains brightly lit to indicate that the ticketer has been seized. Relay 4CB operates, and prepares a circuit to relay 7LH (see Dialing Area Code Digits of Long Haul Toll Call). Relay 6AN operates, closes ground to the lead 5RLS ALM. At contacts 6AN8, and closes lead 4CTP to the number 1 winding of relay 7TP at contacts 6AN7. Relay 5BS operates and closes ground to the number 2 winding of relay 4CA through the path from ground at contacts 5BC3, 6AN6, 4AA1, 5BS2 to the number 2 winding of relay 4CA. Relay 4CA is slow-to-release and did not restore when relay 4BA operated. This circuit is arranged for the registration of the first digit received, therefore when relay 5BS operates ground is also closed to the rotary switch magnet 10SEQ. Rotary switch 10SEQ operates its interrupter springs 1 and 2 and closes ground to relay 9NS. Relay 9NS operates and opens the operating path to magnet 10SEQ. Rotary switch 10SEQ, opens the circuit to relay 9NS, steps its wipers to bank terminal one and also operates its rotary switch off-normal springs to close ground to the number one winding of relay 5BB. Relay 9NS restores. Relay 5BB operates, locks to the number 2 winding of relay 5BB, opens the number 1 winding of relay 5BB, grounds the level A wipers of switch 10SEQ.

*Dialing a five digit calling number*

Relay 4AA follows the dial pulses of the first digit. As relay 4AA restores on the first pulse, it closes ground to the number 1 winding of relay 4CA and magnet 9REC at contacts 4AA1 and at contacts 4AA2, 5BS4 and lead 9 respectively, and opens the circuit to relay 5BA at contacts 4AA3. When relay 4AA reoperates, ground is removed from the number 1 winding of relay 4CA and magnet 9REC, and again closed to relay 5BA. Switch 9REC restores, steps, and operates its rotary off-normal springs to open the circuit to the number 2 winding of relay 4CA and closes ground to magnet 10SEQ relays 5BA and 4CA are slow-to-release and remain operated for the duration of the digit. Magnet 10SEQ operates but switch 10SEQ is an indirect drive switch and does not advance its wipers at this time. At the end of the digit, relay 4CA restores and opens a circuit to relay 4CB. Relay 4CB is slow-to-release and does not restore immediately. During the interval of time when relay 4CA is restored and relay 4CB remains operated, ground is closed through the level A and B wipers of switch 9REC and the level E, F, G, and H wipers of switch 10SEQ to codel relays and codel storage unit 3. The different combinations of the codel relays which operate will depend on the digit dialed. The codel relay combinations and their decimal equivalents are as follows:

| | |
|---|---|
| WX–1 | YZ–6 |
| WY–2 | W–7 |
| WZ–3 | X–8 |
| XY–4 | Y–9 |
| XZ–5 | Z–0 |

As the various W, X, Y and Z codel relays in codel 3 operate and close, they close ground to the corresponding bank terminals of switches 10SEQ and 10SEND. When relay 4CB restores, it opens the circuit to magnet 10SEQ and closes the homing circuit to switch 9REC. Switch 10SEQ restores and advances its wipers to bank terminal 2 and prepares a circuit to codel storage unit 4. Switch 9REC homes to normal and closes ground to the number 2 winding of relay 4CA. Relay 4CA operates and closes a circuit to relay 4CB. Relay 4CB operates. Relay 4AA follows the dial pulses of the four terminal digits. The cycle of operation for relays 4AA, 4CA and 4CB and switches 9REC and 10SEQ for each terminal digit is the same as described. The first, second, third and fourth terminal digits are stored on codels 4, 5, 6 and 7 respectively.

VERIFICATION OF THE CALLING NUMBER

*Verification of the 2nd, 3rd and 4th registered digits*

The circuit is closed to relay 6VE from ground at springs 5BA1 through the circuit consisting of the break springs 6EN4, break spring 5BC6, lead 32 through the level B wiper of switch 10SEQ, bank contact 1, lead 45, make springs 5BF3, break springs 6MC3, break springs 6VA6 through the winding of relay 6VE, when switch 10SEQ sets to the bank contact number 1 upon seizure. Relay 6VE operates, closes a circuit to relay 6VA and lead VP to the verifier at contacts 6VE3, and transfers ground from lead VH to lead VST to start the verifier allotter and mark this circuit as a calling detector to the verifier. When an idle verifier is found, relay 6VA operates in series with a ground connected relay in the verifier, locks, opens a circuit to relay 6VE at contacts 6VA6 and prepares pulsing paths to the verifier through leads VC and VD, and transfers the holding ground to lead 4CU from the detector to control of the verifier.

Strapping on the level C bank of switch 10SEQ provides for repeating the second, third and fourth digits to the verifier through lead VD. This action steps the verifier to find the calling subscriber's line to check the C lead for presence of detector battery. If detector battery is not encountered as when a subscriber has made an error in dialing, ground is returned over lead VA by the verifier. Relay 5BC operates, locks, opens lead VA, closes lead tone start and closes busy tone to lead 4TU, opens a circuit to the number 1 winding of relay 4CA and switch 9REC to prevent further dialing, and transfers holding ground on lead 4CU back to the control of the detector. Relay 6VA restores and the associated verifier releases. If the calling subscriber's line is verified, that is the verifier finds detector battery on the C lead, the verifier restores and has no effect on the operation of the detector. Relay 6VA restores.

*Dialing digit A of the called number office code*

Relay 4AA follows the dialed pulses of digit A. The cycle of operation for relays 4AA, 4CA and 4CB and switches 9REC and 10SEQ during dialing is the same as for the digits of the originating number described previously. At the end of the digit the codel relays in codel storage unit 21 operate and lock to store digit A of the office code, switch 10SEQ advances to bank terminal 7, switch 9REC homes and relays 4CA and 4CB reoperate.

*Dialing digit B of the calling office code*

Relay 4AA follows dial pulses of the digit B. The cycle of the operation for relays 4AA, 4CA and 4CB and switches 9REC and 10SEQ during dialing is the same as previously described. At the end of the digit the codel relays in codel storage unit 22 operate and lock to store digit B of the office code, switch 10SEQ advances to bank terminal 8, switch 9REC homes and relays 4CA and 4CB reoperate.

*Dialing area code digits of long haul toll call*

For a long haul toll call the three area code digits are dialed into this circuit prior to dialing the office code of the called station. These digits are then stored in codel groups 21–23 when switch 10SEQ stops on the 6–8 bank contacts respectively. The second digit of the area code, which is either a "0" or a "1," identifies the call as being a long haul toll call. When this digit is dialed, ground is extended through the level B wiper of switch 10SEQ, which is now on the seventh bank contacts, and through level C wiper of switch 10REC which is on the "0" or "1" bank contact to relay 7LH. Relay 7LH operates, locks, closes ground to the 14th bank contact of switch 10SEND, level B, to provide the long haul marking to the tabulator, and removes ground from the 9–11 bank contacts on level B, switch 10SEQ, to prevent switch 10SEQ from self-interrupted stepping over these bank contacts. The office code and the first terminal digit of the called number are then stored in codel groups 24–26 when switch 10SEQ stops on the 9–11 bank contacts respectively. Codel groups 21–23 close ground to the 2–4 bank contacts of switch 10SEND respectively, to provide the area code marking; codel groups 24–26 close ground potential to the bank contacts 5–7 of switch 10SEND to provide the office code and the first terminal digit marking. The other markings on the banks of switch 10SEND remain the same as described for the dialing of the terminal digits of the called office code. Relay 7LH restores when relay 5BB restores and opens the circuit to relay 7LH.

*Dialing the terminal digits for a 6–7 digit system*

When this ticketer is used with a 6–7 digit telephone system, there will be only two office code digits, however the terminal digits for this system will be received and stored in the same manner as the office code digits. Relay 4AA follows the pulses of the first terminal digit. The cycle of operation for relays 4AA, 4CA and 4CB, and switches 9REC and 10SEQ during dialing is the same as described previously. At the end of the digit, the codel relays in codel storage unit 23 operate and lock to store this digit, switch 10SEQ advances to bank terminal 9, switch 9REC homes, relays 4CA and 4CB reoperate, and ground is closed to magnet 10SEQ to the level B wipers when switch 10SEQ steps to bank terminal 9. Magnet 10SEQ operates and closes ground through the interrupter springs to relay 9NS. Relay 9NS operates and steps the circuit to magnet 10SEQ. Switch 10SEQ restores, steps, and restores the rotary switch normal springs to open the circuit to relay 9NS. Relay 9NS restores. Switch 10SEQ steps the interrupter by relay 9NS to bank terminal 12. Relay 4AA follows the dial pulses of the next three terminal digits. The cycle of operation for relays 4AA, 4CA and 4CB, and switches 9REC and 10SEQ for each terminal digit is the same as previously described. The second, third and fourth terminal digits are stored on codels 27, 28 and 29 respectively.

After the sixth digit (fourth terminal digit), dialed switch 10SEQ steps to bank terminal 15. Should the called number be seven digits, the seventh digit (fifth terminal digit) is stored on codel 30 and switch 10SEQ will step to bank terminal 16 after the digit. When switch 10SEQ steps to bank terminal 15, ground was closed from contacts of relay 5VA through the level B wipers to relay 6MB. Relay 6MB operates, locks, closes the homing circuit to rotary switch 8TMP. Switch 8TMP is used for timing the dialing intervals and its operation is described in a later section. Switch 8TMP homes to normal and closes the circuit to relay 6MC. Relay 6MC operates, locks and opens the homing circuit of switch 8TMP.

If the seventh digit is not dialed within a prescribed time interval, ground is closed through level C wipers of switch 8TMP to relay 7LT. Relay 7LT operates, locks, and closes the circuit to relay 7LTD, and opens the circuit to the number one winding of relay 6AN. Relay 7LTD operates and closes the homing circuit to switch 8TMP. Switch 8TMP homes to normal, closes the circuit to the number one winding of relay 6EN. Relay 6AN restores, opens leads CTP from relay 7TP, and opens the circuit to relays 7TC and 7TD which restore. In the case of a seven digit number, relay 4CA restores at the end of the digit opens a circuit to relay 4CB and completes the circuit to relay 7LD. Relay 7LD operates, locks, opens a circuit to the number 1 winding of relay 6AN, and closes a circuit to relay 7LTD. Relay 4CB restores and switch 10SEQ steps to bank terminal 16. Relay 7LTD operates and closes the homing circuit to switch 8TMP. Switch 8TMP homes to normal and closes the circuit to the number 1 winding of relay 6AN. Relays 6AN, 7TP, 7TC, and 7TD restore.

*Blocked calls*

An associated discriminator circuit searches to mark the ticketer to block any calls to which the calling subscriber is not entitled to access. After the second registered digit switch 10SEQ steps to bank terminal 3 and closes ground to its level B wiper to relay 4DE. Relay 4DE operates, closes a circuit to relay 4DA and to lead 4DP, and transfers ground from lead DH to DST to start the discriminator allotter and mark this circuit as a calling ticketer to the discriminator. When an idle discriminator is found, relay 4DA operates in series with a ground connected relay in the discriminator, locks, opens a circuit to relay 4DE, and prepares the pulsing paths to the discriminator through leads DA and DD. The three digits corresponding to the ABC office code or the digit AB and the first terminal digit in a six digit toll system are sent to the discriminator. If a call is to be blocked to a particular office ground is returned over lead DA by the discriminator. Relay 5BC operates, locks, opens the circuit to relay 4DA, and closes busy tone to lead 4TL, and opens the circuit to the number 1 winding of relay 4CA and 9REC to prevent further dialing. Relay 4DA restores and the associated discriminator releases. If the calling subscriber is to be granted access to the called office, the discriminator restores and has no effect on the operation of the ticketer. Relay 4DA restores.

*Dialing interval timing*

Relay 6AN operates on seizure and closes lead CTP to the number 2 winding of relay 7TP. Relay 7TP follows the 60 i.p.m. ground pulses from lead CTP. On the first pulse, relay 7TP operates and closes a circuit to relay 7TD. Relay 7TD operates and locks from its own contacts in series with the number 2 winding of relay 7TC. Relay 7TP restores at the end of the first pulse, the short is removed from the number 2 winding of relay 7TC. Relay 7TC operates to open the contacts 7TC4, the connection to the RLS Alm. lead, and closes the ground pulses of relay 7TP through the number 1 winding of relay 7TC to the magnet of rotary switch 8TMP. Switch 8TMP steps once each second from ground pulses of relay 7TP and also steps self interrupted over bank terminal 10, level A. If the required one of digits in the calling number and the called number are not dialed before the allotted time, relay 7LTC operates and closes the homing circuit of switch 8TMP. Switch 8TMP homes and causes switch 10SEQ to step to bank terminal 16. If the extra digit is dialed during this time interval, relay 7LD operates, completes a circuit to relay 7LTD, and opens the circuit to the number 1 winding of relay 6AN. Relay 7LTD operates and closes the homing circuit to rotary switch 8TMP. Switch 8TMP homes, relay 4CB restores, and switch 10SEQ steps to bank terminal 16. Relay 6AN restores, opens lead CTP from the number 1 winding of relay 7TP and opens a circuit to the number 2 winding of relays 7TC and 7TB. Relays 7TP, 7TC and 7TB restore.

*Sending digits to the ticketer selector*

The outgoing loop is closed to seize the ticketer selector when switch 10SEQ steps its level B wipers to bank terminal 4 during the registration of the calling subscriber's number, and ground is closed through the level B to the number 2 winding of relay 7PR. Relay 7PR operates, locks, and maintains the outgoing loop when switch 10SEQ steps from bank terminal 4 to bank terminal 5. When bank terminal 6 is reached, the loop is transferred through contacts of relay 7TR, and the first digit of the called subscriber's number is registered by contacts of relay 4AA to the outgoing trunk at this time the digit is being registered by the codel relays. The remaining digits are sent to the ticketer selector in a similar manner. After the last digit of the called number has been dialed, relay 6EN operates, locks, opens the pulsing paths to the ticketer selector, closes lead 4TU, 4RL, and 4CU to leads 4T, 4R, and 4C respectively, and opens the circuit to relays 4CB and 7TR. Relay 7TR restores.

*Stop dial and flashing signal supervision*

If stop dial is encountered during dialing, an all trunks busy condition is encountered, the flashing ground is received over lead 4EC from the ticketer selector. This, however, does not check the dialing operation. When the subscriber has finished dialing, relay 6EN operates and the number 2 winding of relay 6AN is energized from ground on lead 4EC. Relay 6AN follows the ground pulses over lead 4EC and opens and closes ground from springs 5BC4 through lead 10 to magnet 10SEQ. Switch 10SEQ operates and steps its wipers one step for each pulse received. When bank terminal 20 is reached, ground from the level D wipers is closed to the number 2 winding of relay 5BC. Relay 5BC operates, locks, opens the stepping circuit to switch 10SEQ, opens the circuit to the number 2 winding of relay 6EN, closes direct ground to lead 4CU and returns busy tone to the calling subscriber. Relay 6EN restores, opens the outgoing loop to release the succeeding equipment and recloses the incoming loop to relay 4AA. Relay 4AA operates and closes ground to maintain relay 5BA operated. Relay 6AN restores.

*Switch through*

When the rotary switch 10SEQ restores and steps after the last digit is sent to the outgoing trunk, ground is closed to the number 1 winding of relay 6EN. Relay 6EN operates, locks, to the contact 6EN2 through the number 2 winding of relay 6EN, closes lead 4CU from the preceding equipment to lead 4C of the ticketer selector, closes relay 5BA to locking ground on lead 4C, opens the circuit to the number 1 winding of relay 4AA and the number 2 winding of relay 4AA, switches the subscriber's loop from the preceding selector through to the ticketer selector and opens all relays which are held by ground on contact 5BA1 except 6EN. All relays restore except relays 5BA, 5BB, 6EN, and the codel storage relays.

*Called party answer*

When the called party answers, answer supervision is relayed through the trunk circuits and the ticketer selector to this circuit by ground over lead 4EC. Relay 6AN operates, extends relay 7TP to a source of one second time pulses on lead CTP, and transfers the ticketer monitor lamp and lead LP from direct ground to lead 60 i.p.m. through resistor 6R2. This causes the ticketer monitor lamp to flash dimly at 60 i.p.m. to indicate the call has been answered. Relay 7TP follows the pulses at the rate of one pulse per second.

*Called party busy*

If the calling line is busy, busy tone is returned to the subscriber from the succeeding equipment. The ticketer remains operated unitl the calling party disconnects.

*Conversation timing*

This ticketer times the length of the conversation and provides a maximum 309 minute timing interval. The conversation time is accumulated on rotary switches 8TMP, 8TMU and 9TMT. Although the conversation timing cycle begins when answer supervision is received, a grace period of from four to ten seconds is provided before any conversation time is actually registered. Immediately after the grace period, the first minute of conversation is registered. At the end of the first minute of conversation, the second minute is registered, etc., until the end of the call or the 309 minute timing interval elapses. The grace period is designed to prevent ticketing of calls to wrong numbers and its length can be varied. Relay 7TP operates from the first pulse on lead CTP following the operation of relay 6AM and closes a circuit to relay 7TD. Relay 7TD operates and closes its holding circuit through the number 2 winding of relay 7TC which is shunted for the duration of the calls. At the end of this pulse, relay 7TP restores and removes the shunt from the number 2 winding of relay 7TC. Relay 7TC operates in series with relay 7TD and transfers the time pulse circuit through the number 1 winding of relay 7TC to rotary switch 8TMP. Relay 7TP operates on the second pulse on lead CTP and closes magnet 8TMP through the number 1 winding of relay 7TC. Magnet 8TMP operates. At the end of the second pulse, magnet 8TMP restores and the wipers of switch 8TMP are advanced one step. Relays 7TC and 7TD remain operated and the wipers of 8TMP are now stepped once each second until they reach bank terminal 6 at the end of the seventh pulse. At this time switch 10SEND steps, self-interrupted to bank terminal 1 and closes a circuit to relay 6PD the wipers of switch 10SEND remain engaged on bank terminal 1 until the end of the conversation, at which time switch 10SEND begins transferring the ticketing information to the tabulator. Relay 6BD operates, closes a holding path to the number 2 winding of relay 6AN, closes the number 1 winding of relay 7PR to the dater-timer through lead TR, closes relay 4GE in series with the number 1 winding of relay 4GA to lead TP, removes the shunt from the interrupter springs 3 and 4 of switch 8TMP, thereby opening the locking path to relay 7TD, and closes ground through resistor 6R2 to the ticketer monitor lamp. The ticketer monitor lamp lights dimly to indicate that conversation timing has started.

On the eighth pulse relay 7TP operates and closes magnet 8TMP through the number 1 winding of relay 7TC. Magnet 8TMP operates and opens its interrupter springs 3 and 4. The interrupter springs open the hold circuit of relay 7TD. Relay 7TD restores but relay 7TC remains operated on its number 1 winding for the duration of this pulse. Relay 7TP and 7TC and magnet 8TMP restore at the end of the pulse. The wipers of switch 8TMP are advanced to bank terminal 7.

On the 9th pulse relay 7TP operates and closes the circuit to relay 7TD. Relay 7TD operates and closes its holding circuit to the number 2 winding of relay 7TC. When relay 7TP restores at the end of the pulse, relay 7TC operates in series with relay 7TD and transfers the TP pulsing circuit to switch 8TMP.

On the 10th pulse, relay 7TP and magnet 8TMP operate. Relay 7TD restores, but relay 7TC remains operated on its number 1 winding for the duration of the pulse. At the end of this pulse, relays 7TP and 7TC and magnet 8TMP again restore. The wipers of switch 8TMP are advanced to bank terminal 8. In this manner, alternate pulses from lead TP now step switch 8TMP at the rate of one step every two seconds.

At the end of the first and each succeeding minute, the level C wiper is engaged on bank terminal 3. Upon the next pulse following the operation of relays 7TD and 7TC, relays 7TP closes magnet 8TMP and closes ground on the level C wiper to magnet 8TMU. Magnet 8TMP operates and opens the circuit to relay 7TD. Magnet 8TMU operates at the end of these pulses, switch 8TMP advances its wipers to the bank terminal 4 and switch 8TMU advances its wipers one step. In this manner switch 8TMU registers the unit minute digits in codel code on leads W34, X34, Y34 and Z34.

After nine minutes the level C wiper of switch 8TMP is again engaged on bank terminal 3 and the wipers of switch 8TMU are engaged on bank terminal 8. Upon the next pulse following the operation of relays 7TD and 7TC, relay 7TP closes the circuit to magnets 8TMP, 8TNU and 9TMT. At the end of this pulse, switches 8TMP, 8TMU and 9TMT advance their wipers one step. Switch 8TMU steps, self-interrupted, from ground on the level B, bank terminal nine and advances its wipers to bank terminal ten. A ten minute interval will elapse before the wipers of switch 8TMU engage bank terminal 8. After each subsequent ten minute interval, when switch 8TMU engages bank terminal 8, switch 9TMT advances its wipers one step. Levels A and B of switch 9TMT are scanned at 100 minute intervals and thus mark, in codel form, the ten minute digits on leads W33, X33, Y33 and Z33. The wipers of level C, E and F have two of their three wipers removed and are spaced 100 minutes apart. Level C is scanned during the first 100 minute interval, level E during the second hundred minute interval and level F during the third hundred minute interval. One wiper of level D is removed to have this level scanned only during the second and third hundred minute interval, thus, the hundred minute digits are registered in codel form on leads W32, X32, Y32 and Z32.

Should the conversation time reach 300 minutes, relay 7TE operates from ground on the level F wiper of switch 9TMT engaged on bank terminal 10. Relay 7TE closes ground to lead Z32, closes ground to lead 300 min. alm., and closes lead 60 i.p.m. to the ticketer monitor lamp. The ticketer monitor lamp flashes brightly at 60 i.p.m. to indicate that 300 minutes of conversation time have elapsed. At this time leads W32, Z32, Z33 and Z34 are grounded and register digits "300" as the conversation time. The ticketer is capable of registering the conversation time up to a maximum of 309 minutes. At the start of the 310th minute, the wipers of switch 9TMT are advanced to normal, relay 7TE restores and the cycle of conversation time continues as before.

*End of conversation*

When the called party disconnects, ground is removed from the lead 4EC to open the operating path to relay 6AN. Relay 6AN remains operated on its holding path until the calling party disconnects. When the calling party disconnects, the ticketer selector releases and removes ground from lead C to open the circuit to relay 5BA. The preceding equipment releases, but this circuit will not release until the stored call information has been transferred to the tabulator. Relay 5BA restores, closes a circuit to the number 2 winding of relay 5BC, and opens the circuit to relays 6AN and 6EN. Relay 5BC operates, grounds lead 4CU to guard this switch against seizure, closes ground to relay 4GE, and closes ground through number 1 winding of relay 4GA over lead TP to the tabulator. Relay 6AN restores and opens the timing circuits. Relay 6EN restores and transfers the ticketer monitor lamp from resistance 6R2 ground to lead 120 i.p.m. through resistor 5R1. The ticketer monitor lamp flashes dimly at 120 i.p.m. until the stored information has been transferred to a tabulator. Relay 4GE operates, closes ground to lead TST to the tabulator allotter, and removes ground from lead TH to mark this circuit as the calling ticketer.

*Transferring ticketing information to a tabulator*

Absence of ground on lead TH permits a tabulator to stop on this switch. When a tabulator is connected to this ticketer, there is a continuity check. If the continuity check circuit is complete, relay 4GA operates its "X" contacts, locks through the number 2 winding of relay 4GA, operates completely, opens a number 1 winding of relay 4GA from lead TP, closes lead TP to magnet 10SEND, and opens a circuit to relay 4GE. Relay 4GE restores, opens lead TST and closes ground to lead TH. The ticketing and record data stored in this switch is now transferred to the tabulator. The switch 10SEND is stepped by pulses from the tabulator through lead TP and a similar switch is stepped in unison in the tabulator. As the wipers of switch 10SEND are advanced on each step that closes grounds from the codels on this circuit through bank terminals on leads W, X, Y and Z to operate codel groups in the tabulator.

The order in which the data is transferred is as follows:

Bank Terminals 2: Called number, office code A digit (codel 21)
Bank Terminals 3: Called number, office code B digit (codel 22)
Bank Terminals 4: Called number, 1st terminal digit (codel 23)
Bank Terminals 5: No information
Bank Terminals 6: No information
Bank Terminals 7: No information
Bank Terminals 8: No information
Bank Terminals 9: No information
Bank Terminals 10: Calling number (5), office code C digit (codel 3)
Bank Terminals 11: Conversation time, hundreds digit (minutes)
Bank Terminals 12: Conversation time, tens digit (minutes)
Bank Terminals 13: Conversation time, units digit (minutes)
Bank Terminals 14: Level D ground indicates a change of toll rates during call
Bank Terminals 15: Ticketer identity, tens digit
Bank Terminals 16: Ticketer identity, units digit
Bank Terminals 17: Called number, 2nd terminal digit (codel 27)
Bank Terminals 18: Called number, 3rd terminal digit (codel 28)
Bank Terminals 19: Called number, 4th terminal digit (codel 29)
Bank Terminals 20:
  Called number (seven digit calls only) (codel 30)
  5th terminal digit
  (Six digit calls only)
  No information
Bank Terminals 21: No information
Bank Terminals 22: Calling number (5), 1st terminal digit (codel 4)
Bank Terminals 23: Calling number (5), 2nd terminal digit (codel 5)
Bank Terminals 24: Calling number (5), 3rd terminal digit (codel 6)
Bank Terminals 25: Calling number (5), 4th terminal digit (codel 7)

*Release from a completed and timed call*

After all data is transferred to the tabulator, switch 10SEND steps to normal and opens the circuit to relay 6BD. Relay 6BD restores, opens lead TR from the dater-timer to the number one winding of relay 7TR or opens the holding circuit to the number 1 winding of relay 7TR if relay 7TR was operated due to a rate change and opens a circuit to the number 2 winding of relay 5BB and the number 2 winding of relay 4GA. Relay 4GA restores. Relay 5BB restores, closes low resistance ground through relay 5BE to magnet 10SEQ, closes ground to lead ATB, removes the holding ground from all codels and opens the circuit to relay 5BC. Relay 5BC operates, closes ground to the number 2 winding of relay 5BC to hold relay 5BC operated, closes ground through leads RLS Alm. to a delayed release alarm, closes lead 120 i.p.m. to the ticketer monitor lamp and closes ground through lead PC to the peg count circuit. The ticketer monitor lamp flashes brightly at 120 i.p.m. to indicate that the ticketer is restoring to normal. Switch 10SEQ steps, interrupted by relay 9NS to normal and when its off-normal springs restore, transfers the circuit from its magnet to the rotary switch magnet 8TMP. In the same manner, switches 8TMP, 8TMU and 9TMT step to normal after each preceding switch has returned to the normal position. During the above homing, relay 5BE remains operated from battery through the various magnets. When all switches are in normal position, relay 5BE restores, removes the 120 i.p.m. ground pulse from the ticketer monitor lamp, opens the circuit to the number 2 winding of relay 5BC, and removes ground from the release alarm lead. Relay 5BC restores and replaces ground on lead 4CU with resistance battery. The ticketer is now idle and free to ticket another call.

*Release from incompleted calls*

If the call is not answered, relay 6AN is not operated and switch 10SEND and relay 6BD remain at normal. When the calling subscriber disconnects, the ticketer selector releases and removes ground from lead 4C to open the circuit to relay 5BA. The preceding equipment releases. Relay 5BA restores, closes the circuit to the number 2 winding of relay 5BC, and opens the circuit to the number 2 windings of relay 5BB and 6EN. Relay 5BC operates and grounds lead 4CU to guard this switch against seizure before release is completed. Relay 6EN restores. Relay 5BB restores, closes low resistance ground through relay 5BE to magnet 10SEQ, closes ground to lead ATB, opens the holding circuit for all codels, and opens the circuit to the number 2 winding of relay 5BC. Relay 5BE operates, closes ground to the number 2 winding of relay 5BC to hold relay 5BC operated, grounds the release alarm lead, closes lead 120 i.p.m. to the ticketer monitor lamp, and grounds lead PC. The ticketer monitor lamp flashes brightly at 120 i.p.m. that the ticketer is in the process of restoring. Switch 10SEQ steps, interrupted by relay 9NS, to normal and opens a circuit to relay 5BE. Relay 5BE restores, extinguishes the ticketer monitor lamp, removes ground from the release alarm lead and opens the circuit to the number 2 winding of relay 5BC. Relay 5BC restores, replaces ground on relay 4CU with resistance battery and closes the homing circuit to switch 9REC. Switch 9REC homes to normal. The ticketer is restored to normal and free to ticket another call.

*Release from a called party busy condition*

When the called subscriber disconnects after receiving busy tone, the loop is opened to the ticketer selector. The ticketer selector and succeeding equipment release and remove ground from lead 4C to open the circuit to relay 5BA. The preceding equipment releases and relay 5BA restores to release the ticketer as described in the preceding section.

*Release from a stop dial condition*

When a calling party disconnects after receiving busy tone due to stop dial supervision the loop circuit is opened to relay 4AA. Relay 4AA restores and opens the circuit to relay 5BA. Relay 5BA restores and removes the holding ground from all relays. All relays except relay 5BC restore and in so doing remove the holding grounds from the codels and close a low resistance homing circuit through relay 5BC to magnets 10SEQ, 8TMU and 9TMT. Relay 5BE operates, closes ground to release alarm lead, closes a circuit to the number 2 winding of relay 5BC to hold relay 5BC operated, closes lead 120 i.p.m. to the ticketer monitor lamp, and closes ground to lead PC. The ticketer monitor lamp flashes brightly at 120 i.p.m. to indicate that the ticketer is restoring to normal. When all switches are in a normal position, relay 5BE restores, releases the 120 i.p.m. ground pulse from the ticketer monitor lamp, removes ground from the release alarm lead and opens the circuit to the number 2 winding of relay 5BC. Relay 5BC restores and replaces ground on lead 4CU with resistance battery. The ticketer is now available to ticket another call.

*Release from a flashing signal condition*

When the calling subscriber disconnects after receiving busy tone, the loop is opened to relay 4AA. Relay 4AA restores and opens the circuit to relay 5BA. Relay 5BA restores and opens the circuit to relay 5BB. Relay 5BB restores and closes low resistance ground through relay 5BE to magnet 10SEQ to complete the release of this circuit as described in the section entitled, "Release From Incompleted Call."

*Release from a timed-out call*

If the subscriber failed to dial the called number within the prescribed time interval, busy tone was returned to the subscriber. The loop is opened and relay 4AA restores upon calling party disconnection. Release of the ticketer is similar to that described in the penultimate section preceding.

*Change of toll rates during call*

Each time the dater-timer changes the toll rates from day to night rates or night to day rates, it closes a ground pulse on lead TR. If a conversation is in progress in this circuit, relay 6BD is operated and the pulse on lead TR closes the circuit to relay 7TR. Relay 7TR operates, locks, and closes ground to the level D bank terminal 14 of switch 10SEND. Relay 7TR remains operated until relay 5BB restores on release.

*Call supervision*

As long as the ticketer is in use, the ticketer monitor lamp is lighted or flashing to indicate the following conditions:

Bright steady lamp: Ticketer seized.
Dim flashing lamp (60 i.p.m.): Call answered, "grace period" preceding conversation timing.
Dim steady lamp: Call answered, ticketer timing the conversation.
Dim flashing lamp (120 i.p.m.): Call completed, ticketer calling for a tabulator and transferring ticket data to it.
Bright flashing lamp (120 i.p.m.): Ticket data transferred, ticketer in process of releasing.
Bright flashing lamp (60 i.p.m.): Conversation interval 300 minutes or longer.

*Discriminator alotter operation*

Ground normally appears on lead DB from the contacts 11CC7 from the discriminator and as long as the discriminator is idle it holds relay 11B normally operated. When a ticketer requests a discriminator, it closes ground through lead DS to relay 11ST. Relay 11ST operates, and closes magnet 11A to the wipers. Ground appearing on bank terminal N and on the associated DS leads for which the discriminators are busy causes magnet 11A to operate, and opens its interrupter springs and advances its wipers. Idle discriminators have resistance ground appearing on their DS leads. When an idle discriminator is encountered, magnet 11A does not operate in series with the resistance ground, and battery through magnet 11A seizes the discriminator. The discriminator then hunts for the calling ticketer, and further operation opens lead DST and closes ground to lead DS to mark the discriminator busy. Relay 11ST restores. Should all the discriminators become busy, the multiple ground is removed from lead DB and relay 11B restores, and removes ground from bank terminal N. Should a ground be closed to lead DST, switch 11A will advance to normal and remain there until a discriminator becomes idle and ground is closed to lead DB.

DISCRIMINATOR OPERATION

*Seizure*

Absence of ground on lead DS marks this circuit idle to the discriminator allotter. When seized, battery is closed over lead DS to the number 2 winding of relay 11CR. Relay 11CR operates, prepares a locking circuit to its number 1 winding, and closes relay 11CC to the interrupter springs of rotary switch 11DT and lead 11DHC. An idle ticketer places ground on its respective lead DH whereas the calling ticketer provides absence of ground on lead DH. Switch 11DT steps self-interrupted from ground on its level A wipers. This ground shunts 11CC and prevents its operation. When absence of ground is encountered on a level A bank contact, relay 11CC is energized from battery through magnet 11DT but magnet 11DT does not operate in series with relay 11CC. Relay 11CC operates, opens the stepping circuit to switch 11DT, closes relay 11CS to lead 11DPC, closes ground to lead DS to mark this circuit busy to the discriminator allotter. Relay 11CS operates in series with battery connected relay DA in the ticketer and closes a locking circuit to the number 1 winding of relay 11CR.

*Office code registration*

Ground pulses corresponding to the ABC digits of the called office code are received simultaneously over leads DC and DD as dialed by the subscriber. The ground pulses of the first digit received from lead DD are closed to switch 11M. Switch 11M operates and steps its wipers to the dialed bank contacts to select the desired hundreds group wiper, and on the first step operates its off-normal springs to close the ground pulses received through lead DC to relay 11CA. Relay 11CA operates and closes ground to switch 11SEQ. Switch 11SEQ is an indirect drive switch and does not operate at this time, only the interrupter springs are operated. Relay 11CA remains operated during pulsing due to its slow-to-release character. After the last pulse of the digit, relay 11CA restores and opens the circuit to magnet 11SEQ. Switch 11SEQ steps its wipers to bank contact number 1 and prepares the circuit to the vertical magnet. On the second digit of the office code, the vertical magnet steps the wipers to the dialed level. Relay 11CA operates for the duration of the pulses and closes ground to switch 11SEQ. Relay 11CA restores after the last pulse of the digit and opens the circuit to magnet 11SEQ. Switch 11SEQ steps its wipers to bank contacts number 2 and prepares the circuit to the rotary magnet. On the third digit received, the rotary magnet steps its wipers to the dialed bank contact corresponding to the called office code. Relay 11CA operates and closes ground to switch 11SEQ. Relay 11CA restores after the last pulse of the digit and opens the circuit to switch 11SEQ. Switch 11SEQ steps its wipers to bank contact number 3 and closes the circuit to relay 11TR. Relay 11TR operates, closes lead DAC to the ABC code strapping field and closes ground to switch 11SEQ. Switch 11SEQ operates its interrupter springs and opens the circuit to relay 11TR. Relay 11TR does not restore immediately because of its slow-to-release characteristic.

*ABC code discriminator*

The strapping of the ABC code strapping field terminal block determines whether or not a call is to be accepted. Offices for which calls are accepted are ungrounded on this block and offices for which calls are rejected are grounded. If the call is to be rejected, ground encountered by the switch bank contact is closed through contacts 11TR2 through lead DA to the ticketer. Ground on lead DA operates a relay in the ticketer to prevent further dialing and to return busy tone to the calling subscriber. Relay 11TR restores after its slow-to-release interval, opens switch 11SEQ, and removes ground from lead DA. Switch 11SEQ steps to bank contact number 4. If the call is to be accepted, the bank terminal corresponding to the dialed ABC code is open, and no ground is closed to lead DA. Relay 11TR restores after its slow-to-release interval and this connects lead DA from the strapping field. Thus, the discriminator has no effect on the ticketer. Switch 11SEQ steps to bank contacts number 4.

*Discriminator release*

When switch 11SEQ steps to bank contact number 4, a circuit is closed to the number 2 winding of relay 11TS. Relay 11TS operates, opens the circuit to the number 1 winding of relay 11CR, short circuits the relay 11CR, restores and opens the circuit to relay 11CC. Relay 11CC restores, transfers ground from lead DS to DV, opens ground from lead HT, and opens the circuit to relay 11CS. Relay 11CS restores and closes low resistance ground through the number 1 winding of relay 11TS to switch 11SEQ. Switch 11SEQ steps self-interrupted to its normal position, opens the circuit to the number 2 winding of relay 11TS, restores its off-normal springs, and transfers homing circuit to switch 11M. Relay 11TS remains operated on its number 1 winding from battery through the switch magnets. Switch 11M steps self-interrupted to its normal position, restores its off-normal springs and closes the number 1 winding of relay 11TS to the release magnet. The release magnet operates and restores the switch shaft to normal. The vertical off-normal springs restore and open the circuit to the release magnet. The release magnet and relay 11TS restore. The discriminator is returned to normal.

*Single digit blocking*

To block any single digit codes, terminal A11 is connected to the corresponding terminal A1 to A10. Switch 11M operates on the first digit received over lead DB from the ticketer, and steps its wipers to the dialed bank contacts. Ground on level C bank contact is closed through lead DA to the ticketer immediately after the completion of dialing the first digit to give the busy signal and prevent further dialing.

*Verification circuit operation verification seizure*

Absence of ground on lead VS marks this circuit idle to the verifier allotter shown on the bottom of FIG. 3. The operation of the verifier allotter is identical to the operation of the discriminator allotter described earlier. When seized, battery is closed over lead VS to the number 2 winding of relay 3CR. Relay 3CR operates, prepares a locking circuit to its number 1 winding and closes relay 3CC at contacts 3CR1 to the interrupter contacts of rotary switch 3VT and at contacts 3CR2 to lead VHC. An idle ticketer places ground on its respective lead VH whereas the calling ticketer provides absence of ground on lead VH. Switch 3VT steps, self-interrupted from ground on its level A wipers. This ground shunts relay 3CC and prevents its operation. When absence of ground is encountered on a level A bank contact, relay 3CC is energized from battery through magnet 3VT, but rotary switch 3VT does not operate in series with relay 3CC. Relay 3CC operates, opens the stepping circuit to switch 3VT, closes a circuit from relay 3CS at contacts 3CC4 to lead VPC, closes ground to lead VS to mark this circuit busy to the verifier allotter. Relay 3CS operates in series with battery connected relay VA in the ticketer and closes the locking circuit to the number 1 winding of relay 3CR.

*Line registration*

Ground pulses corresponding to the digits required to determine the calling subscriber's line are received simultaneously as dialed by the subscriber over leads VC and VD from the ticketer. The ground pulses of the first digit received through lead VD are closed to switch 2M. Switch 2M operates and steps its wipers to the dialed bank contacts to select the desired hundreds group wiper, and on the first step operates its off-normal springs to close the ground pulses received through lead VC to relay 2CA. Relay 2CA operates and closes ground to switch 2SEQ. Switch 2SEQ is an indirect drive switch and does not step at this time, only the interrupter springs are operated. Relay 2CA remains operated during pulsing due to its slow-to-release characteristic. After the last pulse of the digit, relay 2CA restores and opens the circuit to rotary switch 2SEQ. Switch 2SEQ steps its wipers to bank contacts number 1 and prepares the circuit to the vertical magnet. On the second digit the vertical magnet steps the wipers to the dialed level. Relay 2CA operates for the duration of the pulses and closes ground to switch 2SEQ. Relay 2CA restores after the last pulse of the digit and opens the circuit to magnet 2SEQ. Switch 2SEQ steps its wipers to bank contacts number 2 and prepares the circuit to the rotary magnet. On the third digit the rotary magnet steps the wipers to the dialed bank contact corresponding to the calling line number dialed by the subscriber. Relay 2CA operates and closes ground to switch 2SEQ. Relay 2CA restores after the last pulse of the digit and opens the circuit to magnet 2SEQ. Switch 2SEQ steps its wipers to bank contacts number 3 and closes the circuit to relay 2TR. Relay 2TR operates, closes a +90 volt detector battery potential through lead VBC to the ticketer, closes relay 2DR to the C lead to the calling subscriber's line, closes a circuit to relay 2ND and closes ground to switch 2SEQ. Switch 2SEQ operates its interrupter springs and opens the circuit to relay 2TR. Relay 2TR does not restore immediately because of its slow-to-release characteristic.

*Line verification*

If the calling subscriber has correctly dialed his number into the ticketer, relay 2DR operates from the +90 volt detector battery placed on the C lead by this circuit through the preceding equipment. Relay 2DR operates and opens the circuit to relay 2ND, preventing its operation. Relay 2TR restores after its slow-to-release interval opens the circuit to 2SEQ, opens the circuit to 2DR, and removes the +90 volt detector battery from lead VBC. Switch 2SEQ steps to bank contact number 4. Relay 2DR restores. If the calling subscriber has incorrectly dialed his number into the ticketer, that is, dialed a number that does not correspond to the line being used, a +90 volt detector battery will not be found on the register line and relay 2DR does not operate. Relay 2ND operates, locks, and prepares a ground circuit to lead VAC. Relay 2TR restores after its slow-to-release interval, closes the ground circuit to lead VAC, opens the circuit to switch 2SEQ, removes the +90 volt potentials from lead VBC and closes ground to lead VBC. Ground closed to lead VAC serves as a "no verification" signal to the ticketer and operates a relay in the ticketer to prevent completion of the call. Switch 2SEQ steps to bank contact number 4.

*Release*

When switch 2SEQ steps to bank contact number 4, the circuit is closed to the number 2 winding of relay 3TS. Relay 3TS operates, opens the circuit to the number 1 winding of relay 3CR, short circuits the number 2 winding of relay 3CR. Relay 3CR restores and opens the circuit to relay 3CC. Relay 3CC restores, transfers ground from lead VS to lead VB, opens the circuit to relay 3CS and opens the circuit to relay 2ND (if the calling line was not detected). Relay 3CS restores and closes low resistance ground through the number 1 winding of relay 3TS to switch 2SEQ. Switch 2SEQ steps self-interrupted to its normal position, opens the circuit to the number 2 winding of relay 3TS, restores its off-normal springs, and transfers homing circuit to switch 2M. Relay 3TS remains operated on its number 1 winding from battery through the switch magnets. Relay 2ND restores. Switch 2M steps self-interrupted to its normal position, restores its off-normal springs, and closes the number 1 winding of relay 3TS to the release magnet. The release magnet operates and restores the switch magnet to normal. The vertical off-normal springs restore and open the circuit to the release magnet. The release magnet and relay 3TS restore.

While one embodiment of the invention has been disclosed, it will be understood that various modifications may be made therein which are within the true spirit and scope of the invention.

What is claimed is:

1. In an automatic telephone system comprising, a first exchange provided with first switching apparatus and a first subscriber station identified by a first plural digit directory number, a second exchange provided with second switching apparatus and a second subscriber station identified by a second plural digit directory number, a calling device at said first station, a first repeater in said first exchange provided with a first register and a second register, a calling number verifier, and a called number discriminator, means controlled by said first station calling device for operating said first switching apparatus to extend a first connection to said first repeater, means in said first repeater controlled thereafter by said first station calling device for operating said first register to register therein for recording purposes said digits of said first station directory number, a second means in said repeater for repeating said digits to said verifier simultaneously with their registry for verifying their conformity with said calling station number, fourth means in said first repeater controlled thereafter by said first station calling device for operating said second register to register therein for recording purposes said digits of said second station directory number, for repeating impulses corresponding to said digits of said second station directory number to said second switching apparatus and to said discriminator in order to complete said first telephone connection from said first station to said second station and to determine if said called number is restricted to said calling subscriber, a fifth means in said repeater responsive to said discriminator forwarding a signal indicating the called number to be a restricted number to release said second switching apparatus and to give the calling subscriber a busy signal.

2. An automatic toll ticketing telephone system wherein a first main exchange includes first switching apparatus and a repeater, a first station identified by a plural digit directory number, means in said repeater responsive to said first station dialling the calling subscriber's directory number and the called subscriber's directory number for registering said calling and called numbers, means for simultaneously with said registration completing the route to one of a plurality of distant exchanges, circuit means in said repeater to operatively connect with a verifier to verify said first stations directory number, a discriminator, and a second means in said repeater for simultaneously transmitting the called subscriber station number to said distant exchange and for simultaneously transmitting the called subscriber's station number to said discriminator, and means in said discriminator for determining whether the call to this called number is to be released or retained.

3. A telephone system according to claim 2 in which said discriminator comprises a step by step switching mechanism upon whose bank the restricted numbers are marked by ground potential.

4. A telephone system as claimed in claim 2 including allotter means by which said discriminating apparatus is common to a group of repeaters and is associated with one of said repeaters and where said discriminating apparatus is used only during the interval while the subscriber is dialling the called number.

5. A telephone system according to claim 2 in which said discriminator comprises a first rotary switch and a second step by step switch whereby said discriminator may be arranged to return a signal to said repeater indicating that said call is to be released after dialling of a single digit or a plurality of digits.

6. A telephone system according to claim 3 in which said verification apparatus includes a rotary switch and a step by step mechanism, whereby only a portion of said digits of said subscriber's calling number as dialled by him are registered on said rotary switch to select said group in which said subscriber is located and are registered on said step by step switch to select the specific line terminal dialled by the calling subscriber, and also includes means for impressing a high voltage potential from said repeater to the calling station terminal and back over said step-by-step switch banks, a first relay in said discriminator operated in response to said high voltage returned through said step by step switch banks to prevent a release signal from being forwarded to said repeater.

7. A telephone system as claimed in claim 6, including a second relay means operated in case said first relay in said discriminator fails to operate to forward a release signal to said repeater.

8. In an automatic toll ticketing telephone system with a plurality of trunk line interconnected exchanges wherein one of said exchanges includes switching apparatus and a recording repeater accessed therefrom, a calling station number verifier and a called number discriminator accessible to said repeater, a calling station identified by a plural digit directory number, impulse repeating means in said repeater operated responsive to the operation of a calling device at said calling station to repeat the impulses, first circuit means in said repeater operated upon access of said repeater to operatively connect with said verifier, a calling number register and a called number register in said repeater, said calling number register operated in response to the operation of said impulse repeating means and the dialling of the calling subscribers directory number at said calling station to register said number therein, second circuit means operated responsive to the operative connection with said verifier to operate said verifier simultaneously by said repeated impulses to verify said calling station directory number's proper dialling by said calling subscriber, digit counting means in said repeater also simultaneously operated by said impulse repeating means, transfer means in said repeater operated by said counting means upon said counting means counting the total number of said calling subscriber station directory number digits to transfer the succeeding pulses to said called number register, other circuit means operated upon the completed registry of said calling number to operatively seize said called number discriminator and an outgoing trunk line, said called number register, said called number discriminator and the outgoing trunk line thereafter simultaneously pulsed from said impulse repeating means, circuit means in said called number discriminator operated by said repeated pulses to effect the blocking from said outgoing trunk line of all remaining dialed digits via said repeater upon the subscriber dialing a code to which he is denied automatically ticketed calls.

9. The combination in a telephone system according to claim 8 wherein said repeater includes detector battery means to apply an increased potential to the calling line control lead upon operatively connecting with said verifier, means in said verifier responsive to said increased potential upon reaching said calling line control lead in response to the proper dialing of the calling line number by said calling subscriber to disconnect from said repeater.

10. The combination in a telephone system according to claim 8 wherein said verifier includes means to forward a ground potential to said repeater upon non-verification of said calling number as dialed by said subscriber, circuit blocking means in said repeater operated in response to said ground potential from said verifier to block all subsequent pulses and return a busy tone to said calling subscriber.

11. The combination in a telephone system according to claim 8 wherein said discriminator includes means responsive to the first three repeated digits to it to return a ground potential to said repeater upon said subscriber dialing a restricted number, blocking circuit means in said repeater operated in response to said ground potential from said discriminator to block all subsequent pulses from said trunk line and return a busy tone to said calling subscriber.

References Cited in the file of this patent

UNITED STATES PATENTS

| | | |
|---|---|---|
| 2,408,433 | Malthaner | Oct. 1, 1946 |
| 2,698,879 | Shepherd | Jan. 4, 1955 |
| 2,775,648 | Newstedt | Dec. 25, 1956 |
| 2,782,257 | Blashfield et al. | Feb. 19, 1957 |
| 2,886,642 | Morris et al. | May 12, 1959 |